United States Patent [19]

Dano et al.

[11] Patent Number: 4,780,787
[45] Date of Patent: Oct. 25, 1988

[54] SELF-MONITORING DIGITAL SOLID-STATE TRIP RELEASE

[75] Inventors: Maurice Dano; Vincent Corcoles, both of Grenoble, France

[73] Assignee: Merlin Gerin, Grenoble, France

[21] Appl. No.: 76,833

[22] Filed: Jul. 23, 1987

[30] Foreign Application Priority Data

Aug. 8, 1986 [FR] France .................. 86 11613

[51] Int. Cl.⁴ .................................. H02H 3/093
[52] U.S. Cl. .................................. 361/96; 361/93
[58] Field of Search .......... 361/87, 93, 96, 97; 364/184, 186

[56] References Cited

U.S. PATENT DOCUMENTS 4,476,423 10/1984 Mallixk et al. ............. 361/29 X
4,476,511 10/1984 Saletta et al. .............. 361/97 X
4,535,409 8/1985 Jindrick et al. ............. 361/71 X

FOREIGN PATENT DOCUMENTS 2513436 3/1983 France.

OTHER PUBLICATIONS

Siemens Power Engineering, vol. 6, No. 1, pp. 50–51, 1984.

Primary Examiner—A. D. Pellinen
Assistant Examiner—Derek S. Jennings
Attorney, Agent, or Firm—Parkhurst, Oliff & Berridge

[57] ABSTRACT

The digital solid-state trip release is equipped with a watch-dog which monitors the periodic running of the information processing controlled by the microprocessor. When a disturbance or a delay occurs in the periodic cycle, the watch-dog first emits a reinitialization order applied to the microprocessor input to attempt to rerun the periodic cycle. If this attempt is unsuccessful, the watch-dog emits a circuit breaker tripping order.

4 Claims, 3 Drawing Sheets

SELF-MONITORING DIGITAL SOLID-STATE TRIP RELEASE

BACKGROUND OF THE INVENTION

The invention relates to a microprocessor-based digital solid-state trip release for an electrical circuit breaker.

Satisfactory operation of the circuit breaker and more particularly of its solid-state trip release depends on the correct execution of the microprocessor program. Poor execution may be the consequence of a conducted or radiated disturbance which affects satisfactory running of the program. The present invention is based on the ascertainment that the microprocessor always controls a periodic running of information processing, notably a periodic digitization of the phase and neutral currents. This periodic execution can be picked up at any point of the processing channel, notably at the level of the microprocessor which emits periodic control pulses or at the level of the digitization or the input of the digitized signals to the microprocessor. The object of the invention is to achieve a digital solid-state trip release with self-monitoring of the running of the program.

SUMMARY OF THE INVENTION

The solid-state trip release according to the invention comprises:
- current sensors which generate analog signals proportional to the currents flowing in conductors protected by the circuit breaker,
- rectifier circuits to rectify said signals and deliver an analog signal representative of the maximum value of said currents,
- an analog-to-digital converter having an input receiving said analog signal and an output delivering a corresponding sampled digitized signal,
- a microprocessor-based digital processing unit, to which the digitized signal is applied to perform a long delay tripping function and/or a short delay tripping function and which generates a circuit breaker tripping order when preset thresholds are exceeded, said order being delayed according to the value of the signal, said microprocessor periodically performing a digitization,
- a device monitoring the activity of the microprocessor having a digitization rate detector controlled by the microprocessor, said detector being arranged to generate in a first stage, if digitization does not take place, a microprocessor reinitialization signal and subsequently, if digitization continues to be lacking, a circuit breaker tripping order,
- and a circuit breaker tripping means actuated by said tripping orders.

The monitoring device, commonly called watch-dog, monitors the periodic cycle time and checks whether the time exceeds the period preset by the microprocessor. In the event of a failure, the watch-dog emits a microprocessor reinitialization signal to palliate an interruption or a nuisance fleeting break in the microprocessor activity. If the periodic running is resumed following this reinitialization, the solid-state trip release resumes its normal operation, without any special intervention or indication. If, on the other hand, the periodic cycle remains interrupted, the watch-dog emits an alarm and/or circuit breaker tripping signal.

The monitoring device advantageously comprises a capacitor progressively charged and periodically discharged at each pulse from the microprocessor. If the capacitor discharge pulse does not occur or occurs late, the capacitor continues charging and this overcharge can easily be detected by a threshold circuit, for example with an operational amplifier emitting a signal when a preset threshold is exceeded. By having a microprocessor reinitialization signal emitted in a first stage, nuisance trips due to a fleeting disturbance of the program are avoided. The alarm or trip only occurs if the periodic running is not resumed, generally due to failure of or damage to the microprocessor or the monitored processing channel.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
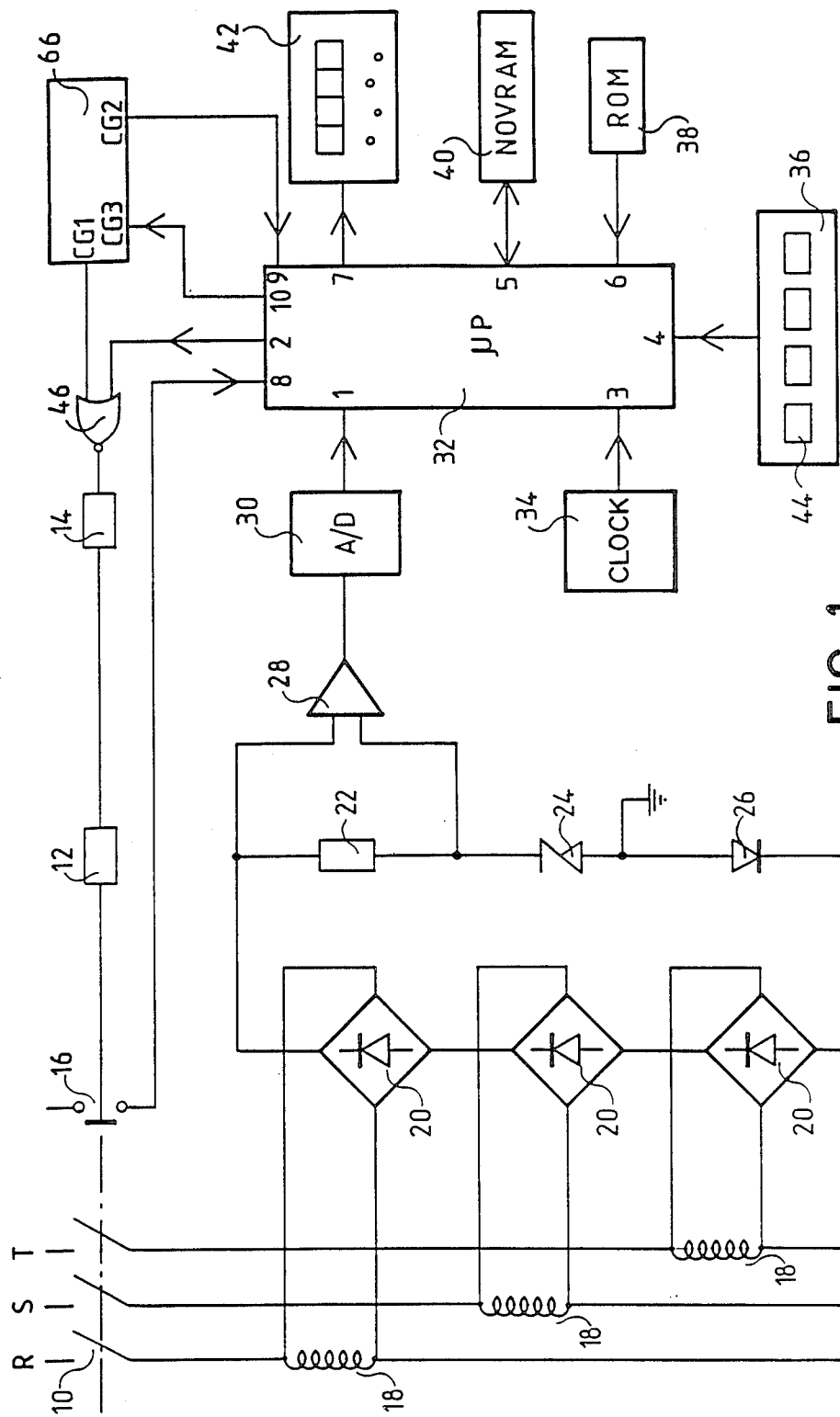
FIG. 1 is a block diagram of the trip release according to the invention equipped with a self-monitoring device.

The invention is hereafter described as applying to a solid-state trip release of the kind described in U.S. patent application No. 827,438, claiming priority of French Patent Application No. 8503159, but it is clear that it can be used for any other kind of digital trip release using a microprocessor-controlled program. In FIG. 1, an electrical distribution system with 3 conductors R, S, T, supplying a load (not represented) comprises a circuit breaker 10 capable of breaking the circuit in the open position. The mechanism 12 of the circuit breaker 10 is controlled by a polarized relay 14 causing tripping of the circuit breaker in the event of an overload or short-circuit. An auxiliary contact 16, operating in conjunction with the main contacts of the circuit breaker 10 indicates the position of these main contacts. Each conductor R, S, T, has associated with it a current transformer 18 which delivers a signal proportional to the current flowing in the associated conductor, this signal being applied to a full-wave rectifier bridge 20. The outputs of the 3 rectifier bridges 20 are connected in series in a circuit comprising a resistor 22, a Zener diode 24 and a diode 26 to provide at the terminals of the resistor 22 a voltage signal proportional to the maximum value of the current flowing in the conductors R, S, T, and at the terminals of the diode 24 a voltage supply to the electronic circuits. The voltage signal is applied to the input of an amplifier 28, whose output is connected to an analog-to-digital converter 30. The output of the analog-to-digital converter 30 is connected to an input/output 1 of a microprocessor 32. The microprocessor 32 comprises in addition an output 2 connected to the polarized relay 14, an input 3 receiving the signals from a clock 34, an input 4 connected to a keyboard 36, an input 6 connected to a ROM memory 38, an input/output 5 connected to a non-volatile NOV-RAM memory 40, an output 7 connected to a display means 42 and an input 8 connected to the auxiliary contact 16.

The trip release according to FIG. 1 performs the protection function, notably long delay tripping and short delay tripping respectively when an overload and a fault occur in the conductor R, S, T circuit. The digital signal representative of the maximum value of the current in the conductors R, S, T is applied to input 1 of the microprocessor 32 and compared with threshold values stored in a memory to detect if these thresholds are exceeded and to generate a delayed or instantaneous tripping action, which is transmitted to the polarized relay 14 to bring about breaking of the circuit breaker 10. The trip release may of course perform other functions, notably earth protection or instantaneous tripping.

The reader should advantageously refer to the above-mentioned patent application for further information on the operation and make-up of this trip release.

According to the present invention, a monitoring device or watch-dog 66 is connected on the one hand to an output 10 of the microprocessor 32 and on the other hand to an input 9 of this microprocessor. The output CG1 of the watch-dog 66 is connected to an input of an OR gate 46, whose output is connected to the polarized relay 14 and whose other input is connected to the output 2 of the microprocessor 32. The watch-dog 66 receives from the microprocessor output 10 pulses CG3 represented in FIG. 3. The period of these pulses, which determine the periodic execution of information processing, is 1.84 milliseconds, but it is clear that any other period can be used.

Figure 2:
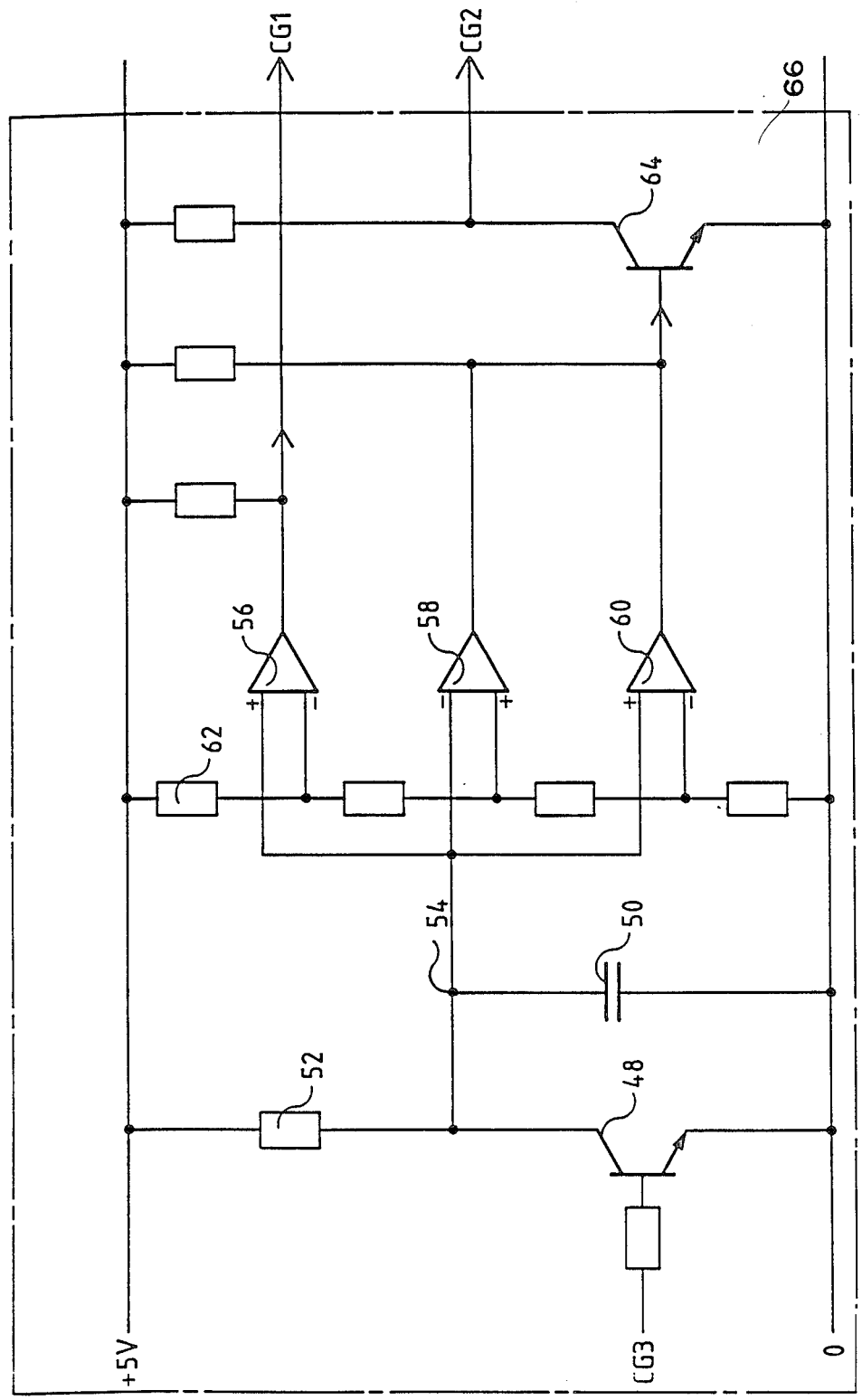
FIG. 2 illustrates the electrical circuit of the self-monitoring device according to FIG. 1.

Referring more particularly to FIG. 2, it can be seen that the watch-dog 66 comprises a transistor 48 whose base is connected to the input CG3 receiving the periodic pulses from the microprocessor 32. The collector and emitter of the transistor 48 are connected to the terminals of a capacitor 50, connected via a resistor 52 to the power supply. The connection point 54 of the capacitor 50 and the resistor 52 is connected on the one hand to the positive inputs of two operational amplifiers 56, 60 and on the other hand to the negative input of an operational amplifier 58. The opposite inputs of the operational amplifiers 56, 58, 60 are connected to a voltage divider bridge 62 connected to the power supply. The output of the operational amplifier 56 is connected to the terminal CG1 of the watch-dog 66 connected to the OR gate 46. The outputs of the operational amplifiers 58, 60 are both connected to the base of the transistor 64. This transistor is a simple inverter. The signal CG2 generated on its collector is connected to the input 9 of the microprocessor 32. Operation of the monitoring device according to the invention is described below, more particularly with reference to FIGS. 3 to 8.

Figure 3:
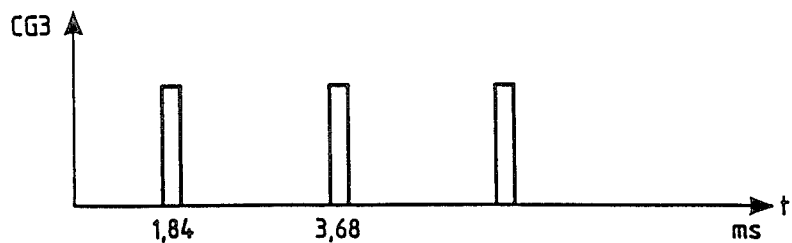
FIGS. 3 to 5 show respectively the variations of the periodic pulses, of the capacitor charge and of the monitoring device output levels, with relation to time in normal operation.
Figure 4:
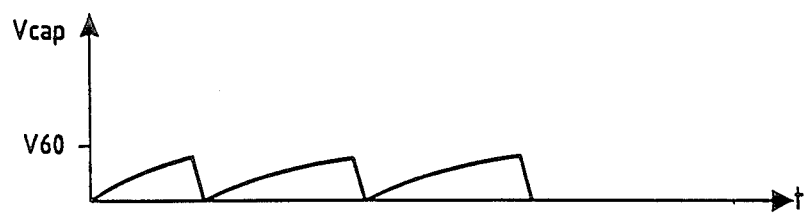
Figure 5:
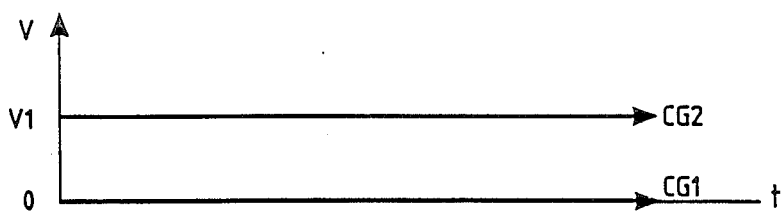

In normal operation, the microprocessor 32 performs a periodic digitization every 1.84 milliseconds and applies to the input CG3 of the watch-dog 66 a pulse of short duration represented in FIG. 3. If no pulse occurs on the input CG3, the transistor 48 is blocked and the capacitor 50 is charged progressively, via the resistor 52. As soon as a pulse occurs, the transistor 48 becomes conductive and short-circuits the capacitor 50 which discharges quickly. Charging and discharging of the capacitor 50 is illustrated by the curve in FIG. 4 and it can easily be seen that this charge never exceeds a preset peak value. This peak value is lower than the thresholds of the operational amplifiers 56, 58, 60, and it should be noted that the output CG1 of the operational amplifier 56 is kept at a low value 0 as is the output of the operational amplifier 60. The signal CG2 is then kept at a constant high level. In these operating conditions, the watch-dog 66 does not intervene.

Figure 6:
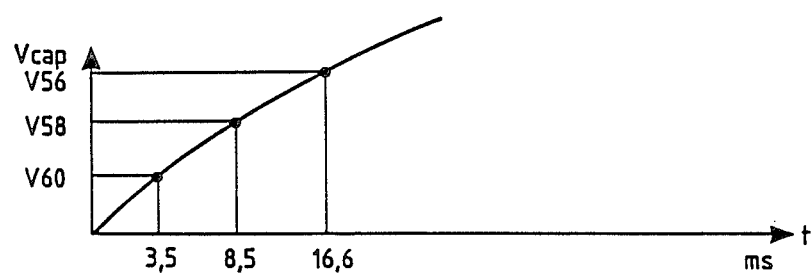
FIGS. 6 to 8 show the variation of the capacitor charge and of the monitoring device output levels when a failure occurs in the periodic execution.
Figure 7:
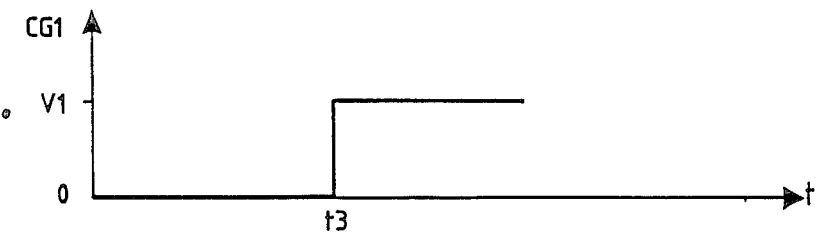
Figure 8:
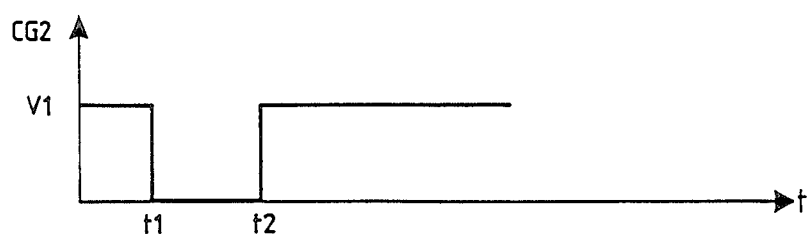

When a pulse applied to the input CG3 of the watch-dog 66 is lacking or delayed, the capacitor 50 continues charging and the voltage at its terminals increases as illustrated in FIG. 6. The threshold V60 of the operational amplifier 60 is exceeded first, for example after 3.5 milliseconds. The output of the operational amplifier 60 then switches to the high value causing conduction of the transistor 64 and switching of the signal CG2 from the high value to the low value (see FIG. 8, time t1). This variation transmitted to the input 9 of the microprocessor 32 has no influence and merely provides a clear variation at time t2 when the threshold V58 of the operational amplifier 58 is exceeded. This overshot causes the output of the amplifier 58 to switch to the low value and consequently blocking of the transistor 64, making the signal CG2 switch to the high value, thus causing a sudden reinitialization signal applied to the input 9 of the microprocessor 32. If this initialization of the microprocessor 32 causes the periodic cycle to be re-run and the periodic pulses zero-resetting the charge of the capacitor 50 to occur, the normal cycle is resumed in the manner described in relation to FIGS. 3 to 5. The interruption of operation and of the periodic information processing execution was fleeting. If on the other hand, the microprocessor reinitialization order fails, the periodic pulses continue to be lacking and the capacitor 50 continues charging. When the threshold V56 of the operational amplifier 56 is exceeded at time t3, the signal CG1 at the output of the watch-dog 66 switches to the high value and is applied via the OR gate to the polarized relay 14 which brings about tripping of the circuit breaker 10.

It can easily be seen that the reinitialization or rerun order of the periodic cycle of the microprocessor 32 in many cases avoids unjustified tripping of the circuit breaker 10. This attempt to reinitialize the microprocessor 32 naturally delays the tripping order a few microseconds but this small time delay does not cause any inconvenience. The electronic circuit of the watch-dog 66 may naturally be achieved in a different way and comprise several successive reinitialization signals without departing from the spirit and scope of the present invention.

We claim:

1. A digital solid-state trip release for an electrical circuit breaker with separable contacts comprising:
   current sensor means for generating analog signals proportional to currents flowing in conductors protected by the circuit breaker;
   rectifier means for rectifying said analog signals and for producing an analog maximum signal representative of a maximum value of said currents;
   analog-to-digital converter means having an input receiving said analog maximum signal for generating a corresponding sampled digitized signal;
   microprocessor-based digital processing unit means, connected to said analog-to-digital converter means, for generating a periodic signal indicative of periodic digital processing of said processing unit, and for generating a first tripping order after at least one of a long delay and short delay when said sample digitized signal exceeds respective predetermined thresholds, said tripping order being delayed according a value of said sampled digitized signal;

means for monitoring said digitial processing unit means, including means for detecting said periodic signal, means for generating a microprocessor reinitialization order if said periodic signal is not detected during a first time period, and means for generating a second tripping order if said periodic signal is not detected during a second time period, longer than said first time period; and circuit breaker tripping means for separating said separable contacts, actuated by said first and second tripping orders.

2. A trip release according to claim 1, said means for monitoring further comprising, a capacitor, means for charging said capacitor, means for discharging said capacitor under control of said periodic signal, and means for causing said reinitialization signal to be emitted when a first charging threshold is exceeded by a voltage across said capacitor and for causing said second tripping order to be emitted when a second threshold is exceeded by said voltage across said capacitor.

3. The trip release according to claim 2, said means for monitoring further comprising a discharge circuit connected to the capacitor and comprising a semiconductor controlled by said periodic signal to periodically discharge the capacitor upon each occurrence of said periodic signal.

4. The trip release according to claim 2, said means for monitoring further comprising, operational threshold amplifier means for delivering said reinitialization signal and said second tripping order when said first and second thresholds are respectively exceeded by said voltage across said capacitor.

* * * * *